US012695517B2

(12) United States Patent
Kurahashi

(10) Patent No.: US 12,695,517 B2
(45) Date of Patent: Jul. 28, 2026

(54) SUBMARINE OPTICAL COMMUNICATION SYSTEM

(71) Applicant: NEC Corporation, Tokyo (JP)

(72) Inventor: Ryu Kurahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 261 days.

(21) Appl. No.: 18/578,083

(22) PCT Filed: Sep. 24, 2021

(86) PCT No.: PCT/JP2021/034965
§ 371 (c)(1),
(2) Date: Jan. 10, 2024

(87) PCT Pub. No.: WO2023/047510
PCT Pub. Date: Mar. 30, 2023

(65) Prior Publication Data
US 2024/0333400 A1 Oct. 3, 2024

(51) Int. Cl.
*H04J 14/02* (2006.01)
*H04B 10/80* (2013.01)

(52) U.S. Cl.
CPC ........ *H04B 10/801* (2013.01); *H04J 14/0215* (2013.01)

(58) Field of Classification Search
CPC ......... H04B 10/25–25891; H04J 14/0201–022
See application file for complete search history.

(56) References Cited

U.S. PATENT DOCUMENTS

2014/0103739 A1* 4/2014 Takigawa ................. H04B 3/44
307/112
2016/0028502 A1* 1/2016 Mateo Rodriguez ........................
H04Q 11/0005
398/49
2020/0259584 A1* 8/2020 Ugajin ................... H04B 10/85
(Continued)

FOREIGN PATENT DOCUMENTS

WO 2021/044993 A1 3/2021
WO 2021/049099 A1 3/2021

OTHER PUBLICATIONS

International Search Report for PCT Application No. PCT/JP2021/034965, mailed on Dec. 14, 2021.
(Continued)

*Primary Examiner* — Nathan M Cors
(74) *Attorney, Agent, or Firm* — Sughrue Mion, PLLC

(57) ABSTRACT
A submarine optical communication system comprising a first terminal station, a second terminal station, a third terminal station, a first branching device, and a first branching/insertion device, wherein the first and second terminal stations transmit each of first and second control signals in a control wavelength band at different times from each other in order to transmit control signals from the plurality of terminal stations to the first branching device and the first branching/insertion device, the first branching device includes a first reception circuit capable of receiving the first control signal and a fourth reception circuit configured to receive an optical signal in the control wavelength band, and the first branching/insertion device includes a second reception circuit capable of receiving the first control signal and a third reception circuit capable of receiving the second control signal.

3 Claims, 10 Drawing Sheets

(56)　　　　　　References Cited

U.S. PATENT DOCUMENTS

| | | | |
|---|---|---|---|
| 2021/0067264 A1* | 3/2021 | Abe | .................... H04J 14/0213 |
| 2021/0194597 A1* | 6/2021 | Aida | ..................... H04B 10/80 |

OTHER PUBLICATIONS

English translation of Written opinion for PCT Application No. PCT/JP2021/034965, mailed on Dec. 14, 2021.

* cited by examiner

SUBMARINE OPTICAL COMMUNICATION SYSTEM 1

FIRST BRANCHING DEVICE 20

FIRST BRANCHING/INSERTION DEVICE 30

FIRST TERMINAL STATION

10A

THIRD TERMINAL STATION

10C

SECOND TERMINAL STATION

10B

SUBMARINE OPTICAL COMMUNICATION SYSTEM 3

Fig.10

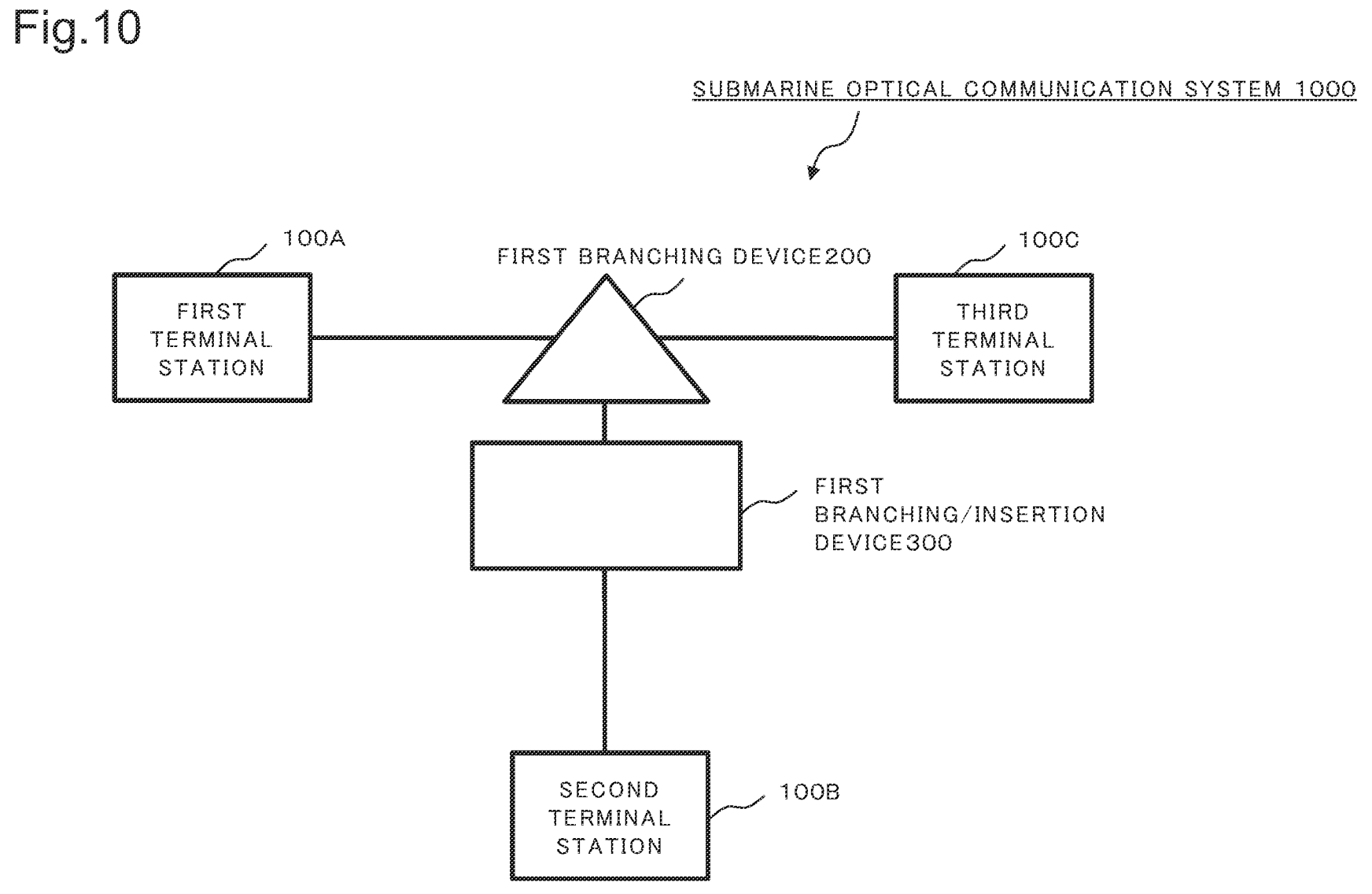

SUBMARINE OPTICAL COMMUNICATION SYSTEM 1000

100C

THIRD TERMINAL STATION

FIRST BRANCHING DEVICE200

FIRST BRANCHING/INSERTION DEVICE300

100A

FIRST TERMINAL STATION

100B

SECOND TERMINAL STATION

SUBMARINE OPTICAL COMMUNICATION SYSTEM

This application is a National Stage Entry of PCT/JP2021/034965 filed on Sep. 24, 2021, the contents of all of which are incorporated herein by reference, in their entirety.

TECHNICAL FIELD

The present invention relates to, for example, a submarine optical communication system being capable of transmitting control signals from a plurality of terminal stations to a branching device and a branching/insertion device.

BACKGROUND ART

In recent years, a submarine optical communication system that transmits and receives an optical signal between terminal stations provided on land through a submarine cable connecting between the terminal stations has been used. A typical submarine optical communication system 1000 is described by using FIG. 10. FIG. 10 is a schematic diagram illustrating a configuration of the typical submarine optical communication system 1000. As illustrated in FIG. 10, the submarine optical communication system 1000 includes a first terminal station 100A, a second terminal station 100B, a third terminal station 100C, a first branching device 200, and a first branching/insertion device 300.

For example, the first branching device 200 splits an optical signal transmitted from the first terminal station 100A, and then transmits the split optical signal to the third terminal station 100C and the first branching/insertion device 300. For example, the first branching/insertion device 300 interrupts an optical signal having a part of wavelengths, in the optical signal from the first branching device 200, and then transmits an optical signal other than the interrupted signal to the second terminal station 100B.

As a technique related to the present invention, for example, PTL 1 discloses a submarine optical communication system including an optical branching device and a relay device that are installed on the sea bottom.

CITATION LIST

Patent Literature

PTL 1: International Patent Publication No. WO2021/044993

SUMMARY OF INVENTION

Technical Problem

In the typical submarine optical communication system illustrated in FIG. 10, the first branching device 200 and the first branching/insertion device 300 are controlled according to a control signal being output from any of the first terminal station 100A, the second terminal station 100B, and the third terminal station 100C.

In this situation, a wavelength of control signals to be output from the first terminal station 100A, the second terminal station 100B, and the third terminal station 100C is preferably identical with each other in order not to limit a wavelength band of an optical signal being transmitted and received between the terminal stations. However, in a case where a wavelength of the control signal is identical, it is likely to interfere control signals with one another when a plurality of terminal stations transmit the control signals, and thereby it has not been possible to provide control signals having an identical wavelength. Accordingly, the number of terminal stations that can transmit a control signal to the first branching device 200 and the first branching/insertion device 300 has been limited.

The present invention has been made in view of the above-described problem, and an object of the present invention is to provide a submarine optical communication system being capable of transmitting control signals having an identical wavelength from a plurality of terminal stations to a branching device and a branching/insertion device.

Solution to Problem

A submarine optical communication system according to the present invention is a submarine optical communication system including:

a first terminal station; a second terminal station; a third terminal station; a first branching device; and a first branching/insertion device, wherein the first terminal station is capable of transmitting a first optical signal including a first main signal and a first control signal to the first branching device, the second terminal station is capable of transmitting a second optical signal including a second main signal and a second control signal to the first branching/insertion device, the first branching device includes a first branching means for being capable of splitting the first optical signal from the first terminal station, a first reception means for being capable of receiving the first control signal from the first optical signal being split by the first branching means, and a first output means for being capable of outputting the first optical signal being split by the first branching means to the first branching/insertion device, the first branching/insertion device includes a second branching means for being capable of splitting the first optical signal from the first output means, a second reception means for being capable of receiving the first control signal included in the first optical signal being split by the second branching means, a third branching means for being capable of splitting the second optical signal from the second terminal station, a third reception means for being capable of receiving the second control signal included in the second optical signal being split by the third branching means, and a first multiplexing means for being capable of multiplexing the first optical signal being split by the second branching means with the second optical signal being split by the third branching means, and outputting first multiplexed light acquired by multiplexing to the first branching device, wavelength bands of the first control signal and the second control signal are an identical control wavelength band, the first terminal station and the second terminal station transmit each of the first control signal and the second control signal at different times from each other, and the first branching device further includes a fourth branching means for splitting the first multiplexed light from the first multiplexing means, a fourth reception means for receiving an optical signal in the control wavelength band being included in one piece of the first multiplexed light being split by the fourth branching means, and a second output means for outputting another piece of the first multiplexed light being split by the fourth branching means to the third terminal station.

Advantageous Effects of Invention

The present invention is able to provide a submarine optical communication system being capable of transmitting control signals from a plurality of terminal stations to a branching device and a branching/insertion device.

BRIEF DESCRIPTION OF DRAWINGS

FIG. 10 is a block diagram for illustrating a problem of the present invention.

EXAMPLE EMBODIMENT

First Example Embodiment

Figure 1:
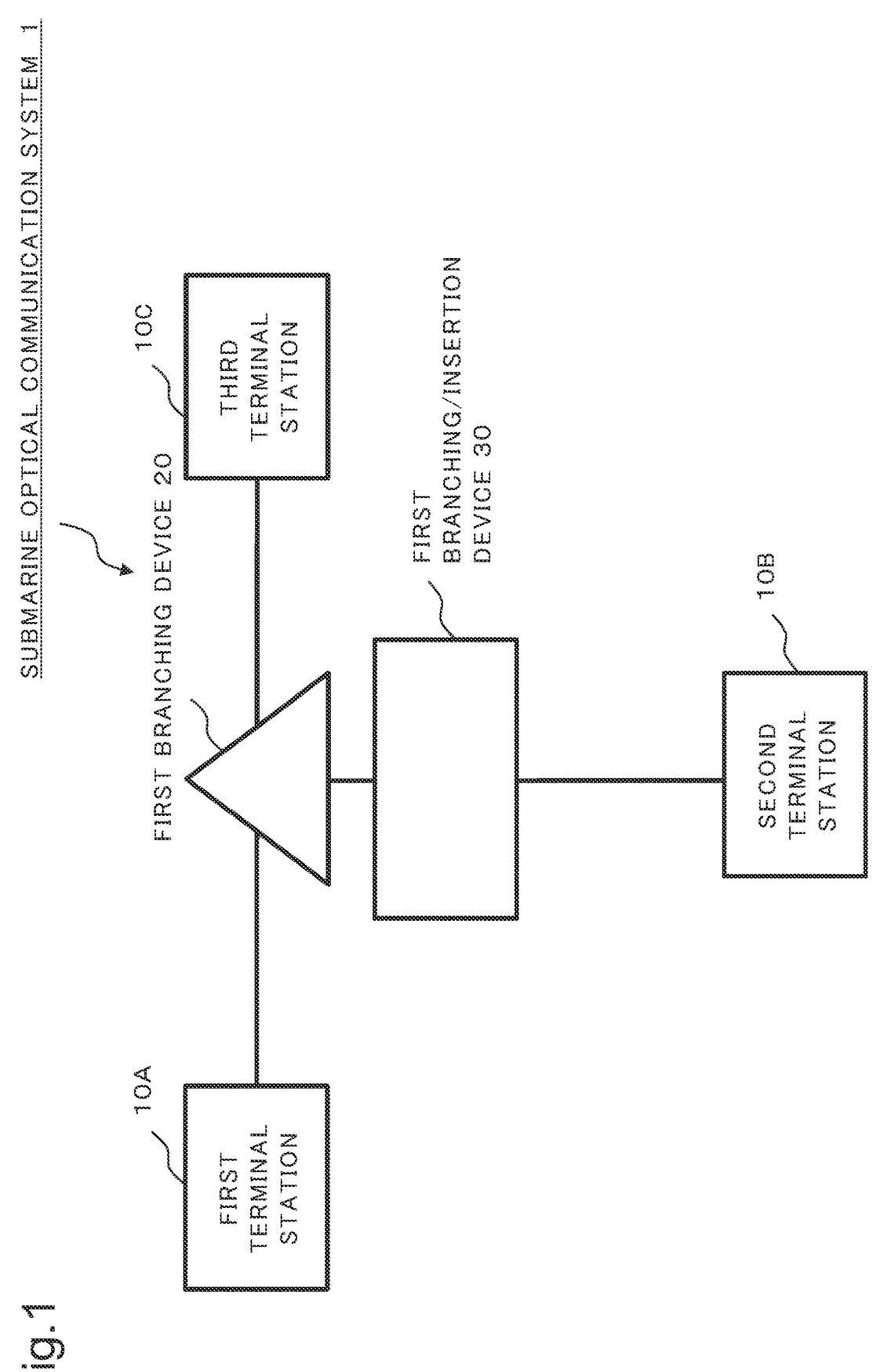
FIG. 1 is a block diagram illustrating a configuration example of a submarine optical communication system according to a first example embodiment of the present invention.
Figure 2:
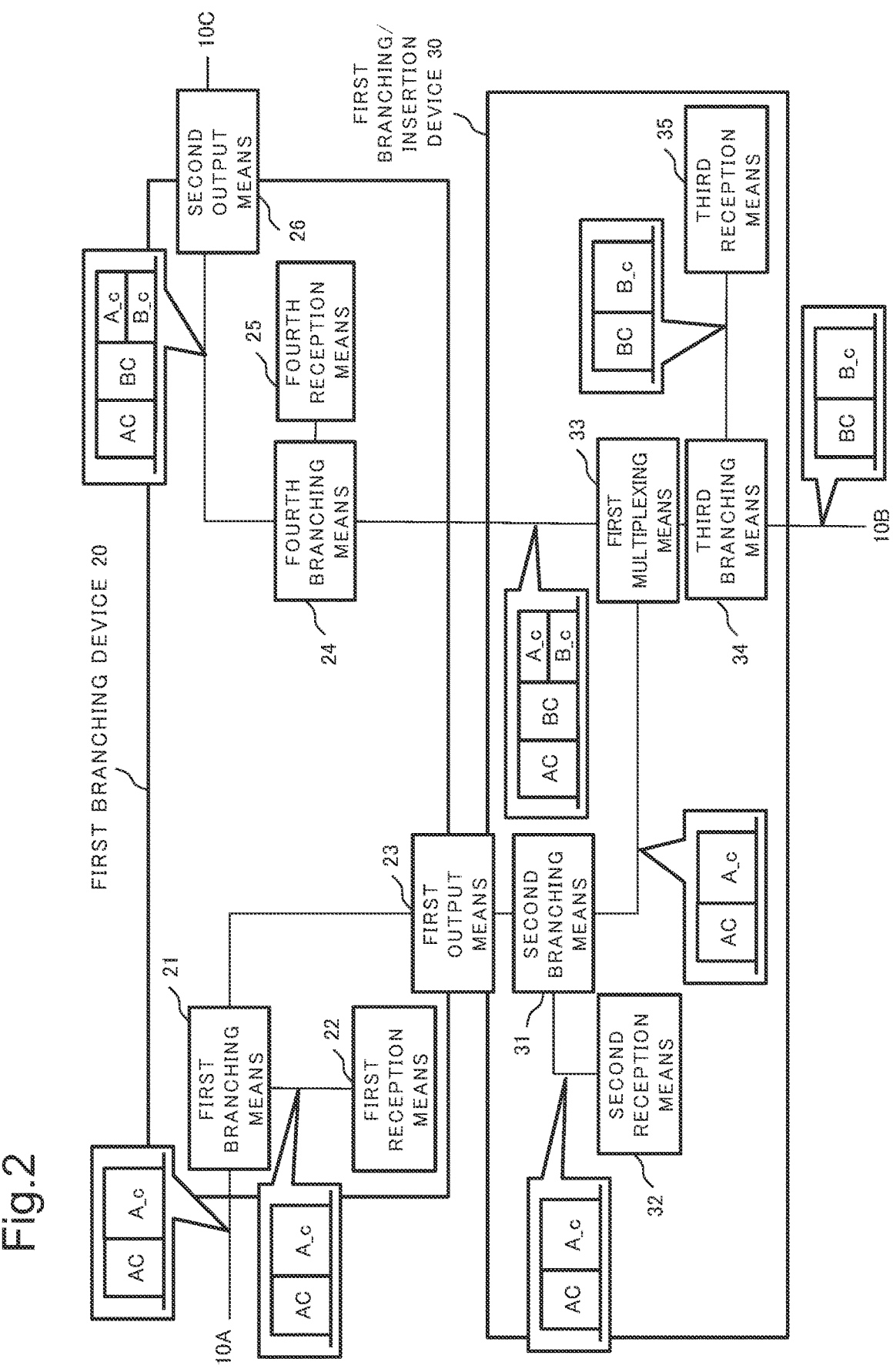
FIG. 2 is a block diagram illustrating details of the submarine optical communication system according to the first example embodiment of the present invention.

A submarine optical communication system 1 according to a first example embodiment is described. FIG. 1 is a block diagram illustrating a configuration example of the submarine optical communication system 1. FIG. 2 is a block diagram illustrating details of the submarine optical communication system 1.

As illustrated in FIG. 1, the submarine optical communication system 1 includes a first terminal station 10A, a second terminal station 10B, a third terminal station 10C, a first branching device 20, and a first branching/insertion device 30. The first terminal station 10A in FIG. 1 is capable of transmitting a first optical signal including a first main signal (corresponding to AC in FIG. 2) and a first control signal (corresponding to A_c in FIG. 2) to the first branching device 20. The first main signal corresponds to AC in FIG. 2. The first control signal corresponds to A_c in FIG. 2.

The second terminal station 10B outputs a second optical signal including a second main signal (corresponding to BC in FIG. 2) and a second control signal (corresponding to B_c in FIG. 2) to the first branching/insertion device 30. The second main signal corresponds to BC in FIG. 2. The second control signal corresponds to B_c in FIG. 2. In FIG. 2, AC denotes an optical signal addressed from the first terminal station 10A to the third terminal station 10C. Further, in FIG. 2, A_c denotes a control signal transmitted from the first terminal station 10A.

As illustrated in FIG. 2, the first branching device 20 includes a first branching means 21, a first reception means 22, a first output means 23, a fourth branching means 24, a fourth reception means 25, and a second output means 26.

Further, as illustrated in FIG. 2, the first branching/insertion device 30 includes a second branching means 31, a second reception means 32, a first multiplexing means 33, a third branching means 34, and a third reception means 35.

In the first branching device 20, the first branching means 21 is capable of splitting the first optical signal from the first terminal station 10A. The first branching means 21 is, for example, an optical coupler. The first reception means 22 is capable of receiving the first control signal from the first optical signal including the first main signal and the first control signal that are split by the first branching means 21. The first output means 23 is capable of outputting another of the first optical signal being split by the first branching means 21 to the first branching/insertion device 30. The first output means 23 is, for example, an output port.

In the first branching/insertion device 30, the second branching means 31 is capable of splitting the first optical signal from the first output means 23. The second branching means 31 is, for example, an optical coupler. The second reception means 32 is capable of receiving the first control signal from the first optical signal being split by the second branching means 31. The third branching means 34 is capable of splitting the second optical signal including the second main signal and the second control signal from the second terminal station 10B. The third branching means 34 is, for example, an optical coupler. The second main signal corresponds to BC in FIG. 2. The second control signal corresponds to B_c in FIG. 2. The third reception means 35 is capable of receiving the second control signal from the second optical signal being split by the third branching means 34.

The first multiplexing means 33 is capable of multiplexing the first optical signal being split by the second branching means 31 with the second optical signal being split by the third branching means 34. The first multiplexing means 33 outputs first multiplexed light acquired by multiplexing to the first branching device 20. Note that, the first control signal A_c included in the first optical signal and the second control signal B_c included in the second optical signal are optical signals in the same wavelength band (control wavelength band). The first terminal station 10A and the second terminal station 10B transmit each of the first control signal A_c and the second control signal B_c at different times from each other. Thus, the first multiplexing means 33 outputs, as first multiplexed light, any of a wavelength-multiplexed signal formed from the first main signal AC, the second main signal BC, and the first control signal A_c, and a wavelength-multiplexed signal formed from the first main signal AC, the second main signal BC, and the second control signal B_c. In FIG. 2, an optical signal in which the first control signal A_c and the second control signal B_c are represented in parallel, e.g., an optical signal output from the first multiplexing means 33, indicates that the optical signal includes any of the first control signal A_c and the second control signal B_c.

In the first branching device, the fourth branching means 24 splits the first multiplexed light from the first multiplexing means. The fourth branching means 24 is, for example, an optical coupler. The fourth reception means 25 receives an optical signal in the control wavelength band included in one division of the first multiplexed light being split by the fourth branching means. The second output means 26 outputs another division of the first multiplexed light being split by the fourth branching means 24 to the third terminal station 10C.

In the submarine optical communication system 1, as described above, the first branching device 20 includes the first reception means 22 and the fourth reception means 25. The first reception means 22 receives the first control signal from the first terminal station 10A. The fourth reception means 25 receives, as first multiplexed light, any of a wavelength-multiplexed signal formed from the first main signal, the second main signal, and the first control signal, and a wavelength-multiplexed signal formed from the first main signal, the second main signal, and the second control signal. Thus, the first branching device 20 can receive both the first control signal from the first terminal station 10A and the second control signal from the second terminal station 10B.

Further, in the submarine optical communication system 1, the first branching/insertion device 30 includes the second reception means 32 and the third reception means 35. The second reception means 32 receives the first control signal from the first terminal station 10A. The third reception means 35 receives the second control signal. Thus, the first branching/insertion device 30 can receive both the first control signal from the first terminal station 10A and the second control signal from the second terminal station 10B.

Furthermore, in the submarine optical communication system 1, control signals can be transmitted from a plurality of terminal stations 10A and 10B to the first branching device 20 and the first branching/insertion device 30.

Figure 3:
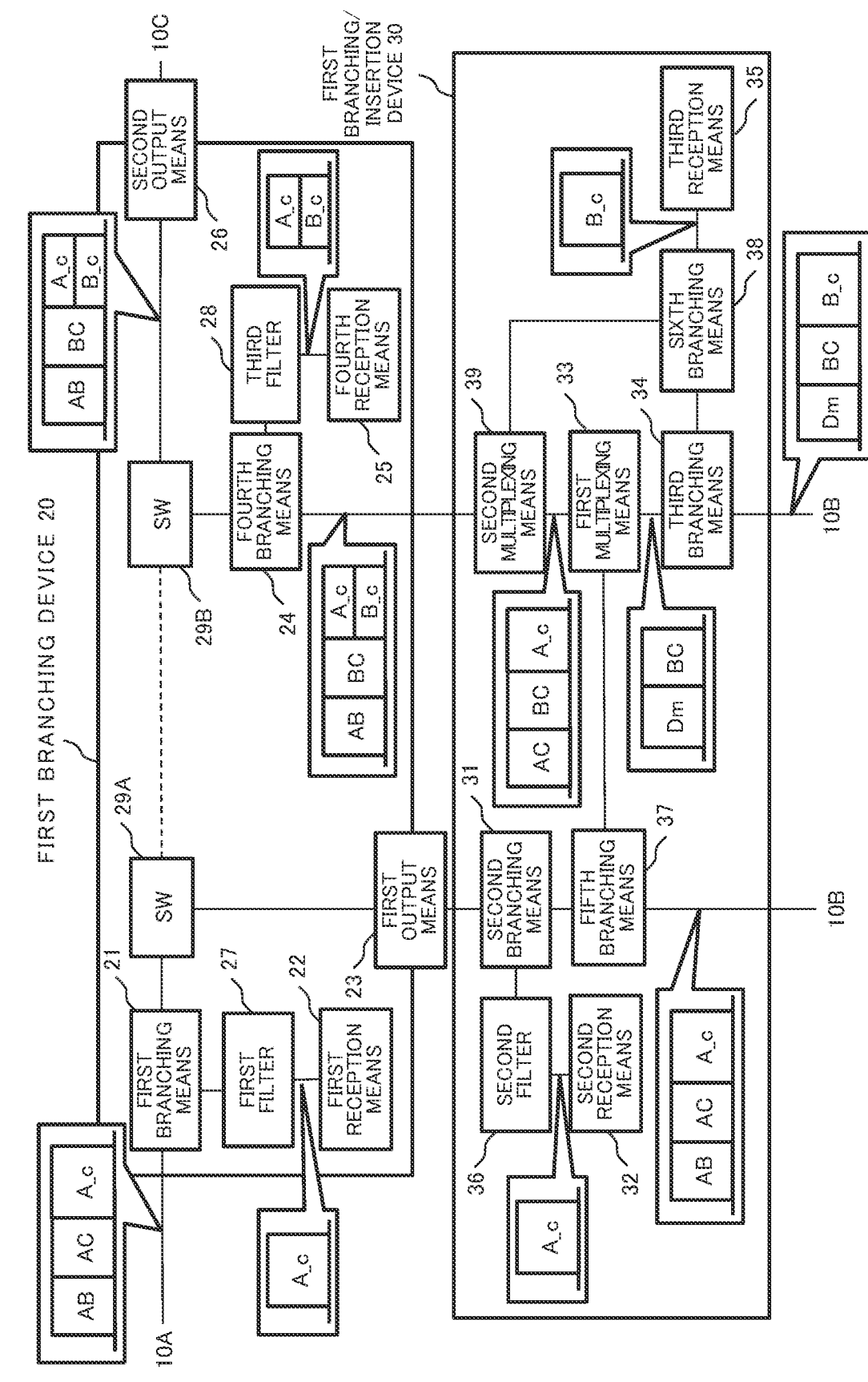
FIG. 3 is a block diagram illustrating a modification example of the submarine optical communication system according to the first example embodiment of the present invention.

Next, a modification example of the submarine optical communication system 1 is described. FIG. 3 is a block diagram illustrating a submarine optical communication system A1, which is the modification example of the submarine optical communication system 1.

As with the submarine optical communication system 1, the submarine optical communication system 1A includes a first terminal station 10A, a second terminal station 10B, a third terminal station 10C, a first branching device 20, and a first branching/insertion device 30.

As with the first branching device 20 in the submarine optical communication system 1, the first branching device 20 in the submarine optical communication system 1A includes a first branching means 21, a first reception means 22, a first output means 23, a fourth branching means 24, a fourth reception means 25, and a second output means 26. The first branching device 20 in the submarine optical communication system 1A further includes a first filter 27, a third filter 28, and switches 29A and 29B.

The first filter 27 is an optical filter that transmits only a control wavelength band. The first filter 27 transmits only a first control signal (corresponding to A_c in FIG. 3), which is an optical signal in the control wavelength band in the optical signal begin split by the first branching means 21, and outputs the transmitted first control signal to the first reception means 22.

The third filter 28 is an optical filter that transmits only the control wavelength band. The third filter 28 transmits only a first control signal (corresponding to A_c or B_c in FIG. 3), which is an optical signal in the control wavelength band in the optical signal being split by the fourth branching means 24, and outputs the transmitted first control signal to the fourth reception means 25.

The switches 29A and 29B are optical switches that switch a path of an optical signal. The switch 29A outputs an optical signal being split by the first branching means 21 toward any of a path on a first output means 23 side or a path on a switch 29B side. In the submarine optical communication system 1A, the switch 29A outputs an optical signal, as a rule, toward the path on the first output means 23 side. By contrast, for example, in the submarine optical communication system 1A, when the second terminal station 10B is not provided, or no optical signals are output to the first branching/insertion device 30, the switch 29A outputs an optical signal to the path on the switch 29B side.

As with the first branching/insertion device 30 in the submarine optical communication system 1, the first branching/insertion device 30 in the submarine optical communication system 1A includes a second branching means 31, a second reception means 32, a first multiplexing means 33, a third branching means 34, and a third reception means 35. The first branching/insertion device 30 in the submarine optical communication system 1A further includes a second filter 36, a fifth branching means 37, a sixth branching means 38, and a second multiplexing means 39.

The second filter 36 is an optical filter that transmits only a control wavelength band. The second filter 36 transmits only a first control signal (A_c in FIG. 3), which is an optical signal in the control wavelength band in the optical signal being split by the second branching means 31, and outputs the transmitted first control signal to the second reception means 32.

The fifth branching means 37 splits the first control signal (corresponding to A_c in FIG. 3) and the first main signal (corresponding to AB and AC in FIG. 3) from the second branching means 31, and outputs the split signals to the second terminal station 10B and the first multiplexing means 33.

The sixth branching means 38 further splits an optical signal (corresponding to the optical signal formed from Dm, BC, and B_c in FIG. 3) from the second terminal station 10B that has been split by the third branching means 34, and outputs the split optical signal to the third reception means 35 and the second multiplexing means 39.

The second multiplexing means 39 multiplexes the first multiplexed light being output from the first multiplexing means with the optical signal being split by the sixth branching means 38, and outputs the multiplexed light to the fourth branching means 24 within the first branching device 20. Note that, in the submarine optical communication system 1A, the first multiplexing means 33 is an optical add-drop multiplexer (OADM). The first multiplexing means 33 accepts dummy light Dm and a main signal BC from the third branching means 34, and accepts a main signal AB and a main signal AC from the fifth branching means 37. The first multiplexing means 33 extracts the main signal AC and the main signal BC from the accepted light, and outputs the extracted signals to the second multiplexing means 39. The first multiplexing means 33 always extracts and outputs an optical signal in the control wavelength band. Thus, when having accepted the control signal B_c from the second terminal station 10B, the first multiplexing means 33 extracts a control signal B_c in the control wavelength band.

Further, when having accepted the control signal A_c from the first terminal station 10A, the first multiplexing means 33 extracts a control signal A_c in the control wavelength band.

Second Example Embodiment

Figure 4:
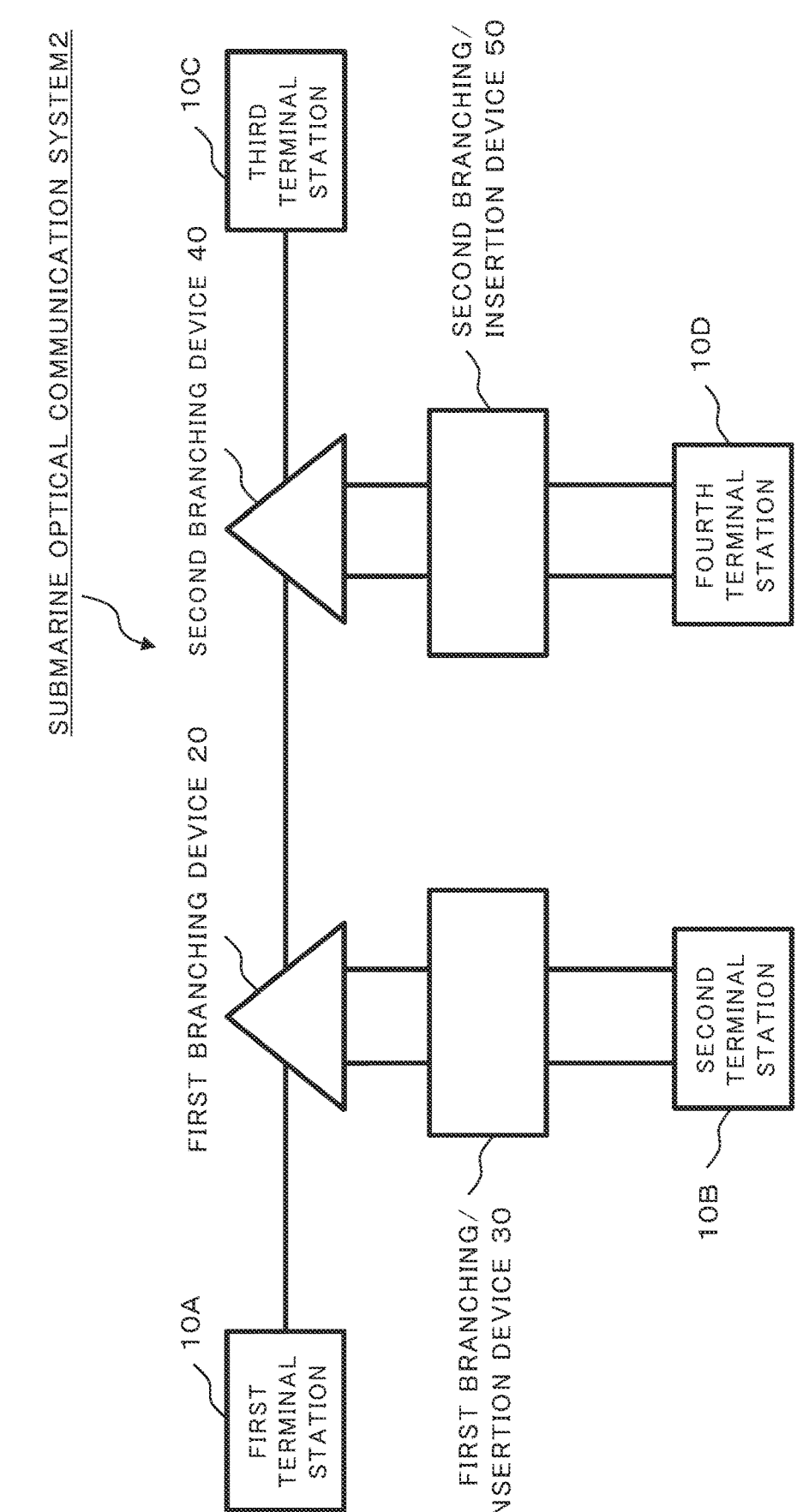
FIG. 4 is a block diagram illustrating a configuration example of a submarine optical communication system according to a second example embodiment of the present invention.

A submarine optical communication system 2 according to a second example embodiment is described. FIG. 4 is a block diagram illustrating a configuration example of the submarine optical communication system 2.

The submarine optical communication system 2 includes a first terminal station 10A, a second terminal station 10B, a third terminal station 10C, a fourth terminal station 10D, a first branching device 20, a first branching/insertion device 30, a second branching device 40, and a second branching/insertion device 50.

As with the first branching device 20 in the submarine optical communication system 1A, the first branching device 20 in the submarine optical communication system 2 includes a first branching means 21, a first reception means 22, a first output means 23, a fourth branching means 24, a fourth reception means 25, a second output means 26, a first filter 27, a third filter 28, and switches 29A and 29B. In the submarine optical communication system 2, the second output means 26 outputs first multiplexed light being split by the fourth branching means 24 to the second branching device 40.

As with the first branching/insertion device 30 in the submarine optical communication system 1A, the first branching/insertion device 30 in the submarine optical communication system 2 includes a second branching means 31, a second reception means 32, a first multiplexing means 33, a third branching means 34, a third reception means 35, a second filter 36, a fifth branching means 37, a sixth branching means 38, and a second multiplexing means 39.

The second branching device 40 includes a seventh branching means 41, a fifth reception means 42, a third output means 43, a tenth branching means 44, an eighth reception means 45, a fourth output means 46, a fourth filter 47, a sixth filter 48, and switches 49A and 49B.

The seventh branching means 41 further splits the first multiplexed light from the second output means 26. The seventh branching means 41 is, for example, an optical coupler.

The fifth reception means 42 receives an optical signal in a control wavelength band from the first multiplexed light being split by the seventh branching means 41. In particular, the fifth reception means 42 receives an optical signal in the control wavelength band from the first multiplexed light via the fourth filter 47. The fourth filter 47 is an optical filter that transmits only the control wavelength band. When the first terminal station 10A has transmitted a control signal A_c, the fifth reception means 42 receives the control signal A_c as an optical signal in the control wavelength band. Alternatively, when the second terminal station 10B has transmitted a control signal B_c, the fifth reception means 42 receives the control signal B_c as an optical signal in the control wavelength band.

The third output means 43 outputs another division of the first multiplexed light being split by the seventh branching means 41 to the second branching/insertion device 50.

The second branching/insertion device 50 includes an eighth branching means 51, a sixth reception means 52, a third multiplexing means 53, a ninth branching means 54, a seventh reception means 55, a fifth filter 56, an eleventh branching means 57, a twelfth branching means 58, and a fourth multiplexing means 59.

The eighth branching means 51 splits the first multiplexed light from the third output means 43. The eighth branching means 51 is, for example, an optical coupler. The sixth reception means 52 is capable of receiving an optical signal in the control wavelength band from the first multiplexed light being split by the eighth branching means 51. In particular, the sixth reception means 52 receives an optical signal in the control wavelength band from the first multiplexed light via the fifth filter 56. The fifth filter 56 is an optical filter that transmits only the control wavelength band. When the first terminal station 10A has transmitted the control signal A_c, the sixth reception means 52 receives the control signal A_c as an optical signal in the control wavelength band. When the second terminal station 10B has transmitted the control signal B_c, the sixth reception means 52 receives the control signal B_c as an optical signal in the control wavelength band.

Figure 6:
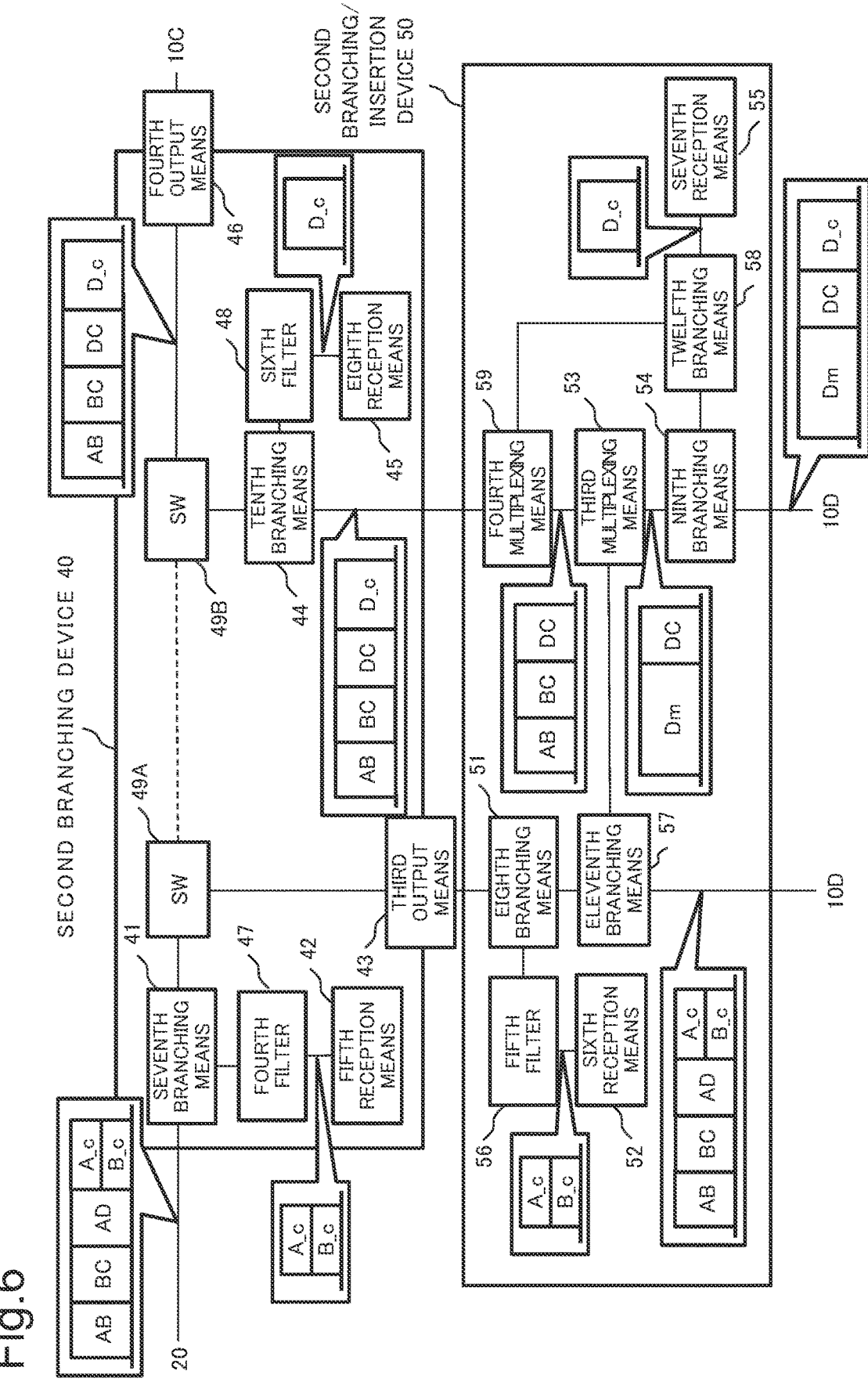
FIG. 6 is a block diagram illustrating details of the submarine optical communication system according to the second example embodiment of the present invention.

The ninth branching means 54 is capable of splitting a third optical signal including a third main signal (corresponding to Dm (dummy light) and DC in FIG. 6) and a third control signal (corresponding to D_c in FIG. 6) from the fourth terminal station 10D. For example, the ninth branching means 54 is an optical coupler.

The seventh reception means 55 is capable of receiving the third control signal from the third optical signal being split by the ninth branching means 54.

The twelfth branching means 58 further splits the third optical signal (corresponding to an optical signal formed from Dm, DC, and D_c in FIG. 6) from the fourth terminal station 10D that has been split by the ninth branching means 54, and outputs the split third optical signal to the seventh reception means 55 and the fourth multiplexing means 59.

The fourth multiplexing means 59 multiplexes the first multiplexed light being output from the third multiplexing means 53 with an optical signal being split by the twelfth branching means 58, and outputs the multiplexed light to the tenth branching means 44 within the second branching device 40. Note that, in the submarine optical communication system 2, the third multiplexing means 53 is an OADM. The third multiplexing means 53 accepts dummy light Dm and a main signal DC from the ninth branching means 54, and accepts a main signal AB, a main signal BC, and a main signal AD from the eleventh branching means 57. The third multiplexing means 53 extracts the main signal AB and the main signal BC from the accepted light, and outputs the extracted signals to the fourth multiplexing means 59. The fourth multiplexing means 59 multiplexes the third control signal (corresponding to D_c in FIG. 6) being split by the ninth branching means 54 with the third main signal (corresponding to the main signal AB, main signal BC, and main signal AD in FIG. 6), and outputs the multiplexed light as second multiplexed light to the tenth branching means 44 within the second branching device 40. The third control signal and the third main signal that are split by the ninth branching means 54 are input to the fourth multiplexing means 59 via the twelfth branching means 58. Note that, the wavelength band (control wavelength band) of the third control signal (corresponding to D_c in FIG. 6) is the same wavelength band as that of a first control signal (corresponding to A_c in FIG. 6) and a second control signal (corresponding to B_c in FIG. 6).

In the second branching device 40, the tenth branching means 44 splits the second multiplexed light. The tenth branching means 44 is, for example, an optical coupler. The eighth reception means 45 receives the third control signal (corresponding to D_c in FIG. 6) in the control wavelength band from one division of the second multiplexed light being split by the tenth branching means 44. In particular, the eighth reception means 45 receives one division of the second multiplexed light via the sixth filter 48. The sixth filter 48 is, for example, an optical filter that transmits only the control wavelength band.

The fourth output means 46 outputs another division of the second multiplexed light being split by the tenth branching means 44 to the third terminal station 10C.

As described above, the submarine optical communication system 2 has a similar configuration to the submarine optical communication system 1, so that the first branching device 20 can receive both the first control signal from the first terminal station 10A and the second control signal from the second terminal station 10B. Further, the first branching/insertion device 30 can receive both the first control signal from the first terminal station 10A and the second control signal from the second terminal station 10B. In the submarine optical communication system 2, accordingly, control signals can be transmitted from a plurality of the terminal stations 10A and 10B to the first branching device 20 and the first branching/insertion device 30.

Further, the submarine optical communication system 2 includes the second branching device 40 including the fifth reception means 42 and the eighth reception means 45. The fifth reception means 42 receives, as first multiplexed light, any of a wavelength-multiplexed signal including a first main signal (corresponding to, for example, AB in FIG. 6), a second main signal (corresponding to, for example, BC in FIG. 6), and the first control signal (corresponding to A_c in FIG. 6), and a wavelength-multiplexed signal including the first main signal, the second main signal, and the second control signal (corresponding to B_c in FIG. 6). The eighth reception means 45 receives the third control signal (corresponding to D_c in FIG. 6). Thus, the second branching device 40 can receive the first control signal from the first terminal station 10A, the second control signal from the second terminal station 10B, and the third control signal from the fourth terminal station 10D.

Furthermore, in the submarine optical communication system 2, the second branching/insertion device 50 includes the sixth reception means 52 and the seventh reception means 55. The sixth reception means 52 receives, as first multiplexed light, any of a wavelength-multiplexed signal including the first main signal (corresponding to, for example, AB in FIG. 6), the second main signal (corresponding to, for example, BC in FIG. 6), and the first control signal (corresponding to A_c in FIG. 6), and a wavelength-multiplexed signal including the first main signal, the second main signal, and the second control signal (corresponding to B_c in FIG. 6). The seventh reception means 55 receives the third control signal (corresponding to D_c in FIG. 6). Thus, the second branching/insertion device 50 can receive the first control signal from the first terminal station 10A, the second control signal from the second terminal station 10B, and the third control signal from the fourth terminal station 10D.

As described above, in the submarine optical communication system 2, control signals can be transmitted from the plurality of terminal stations 10A and 10B to the first branching device 20 and the first branching/insertion device 30. Furthermore, control signals can be transmitted from a plurality of the terminal stations 10A, 10B, and 10D to the second branching device 40 and the second branching/insertion device 50.

Third Example Embodiment

Figure 7:
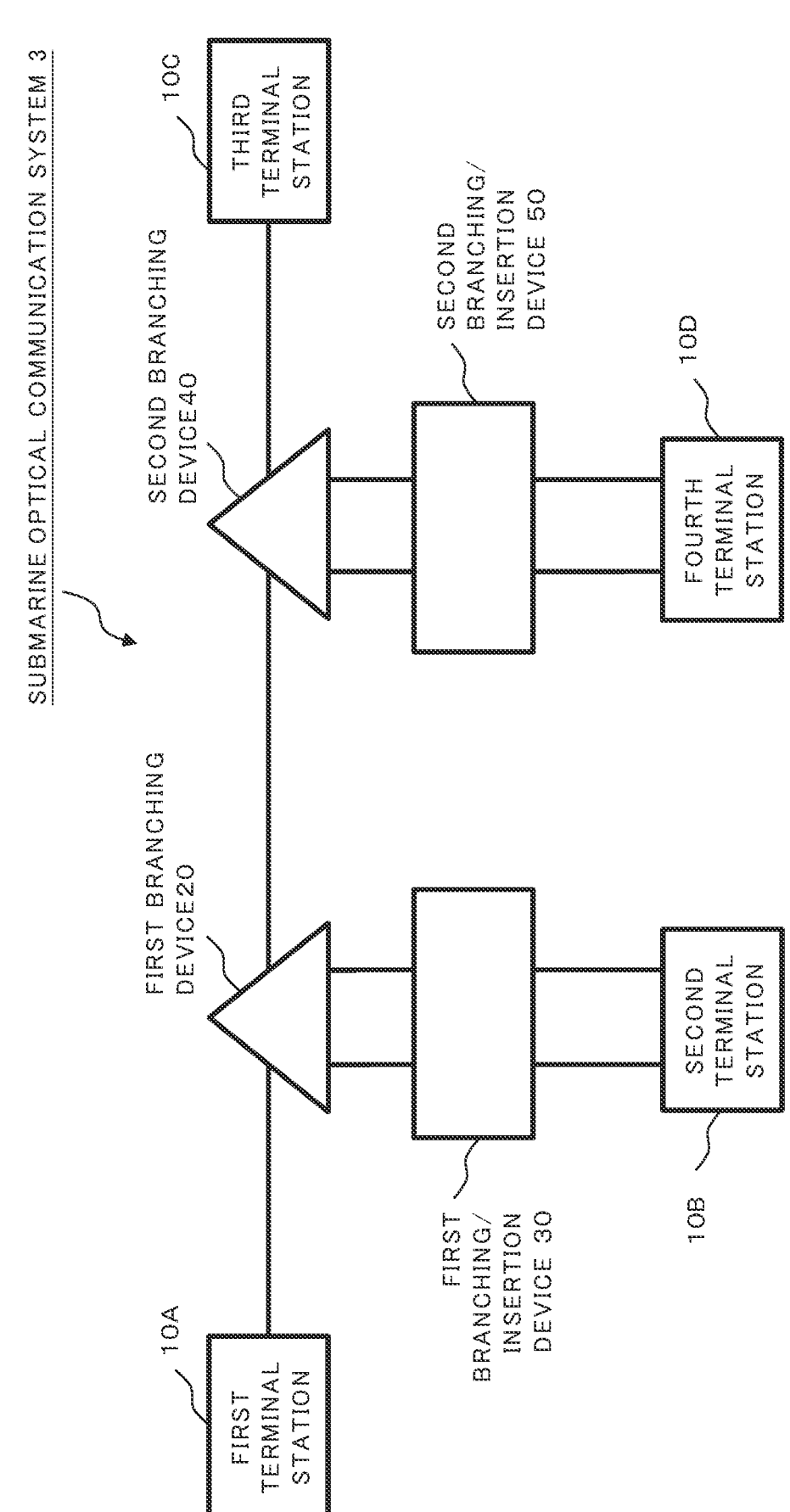
FIG. 7 is a block diagram illustrating a configuration example of a submarine optical communication system according to a third example embodiment of the present invention.
Figure 8:
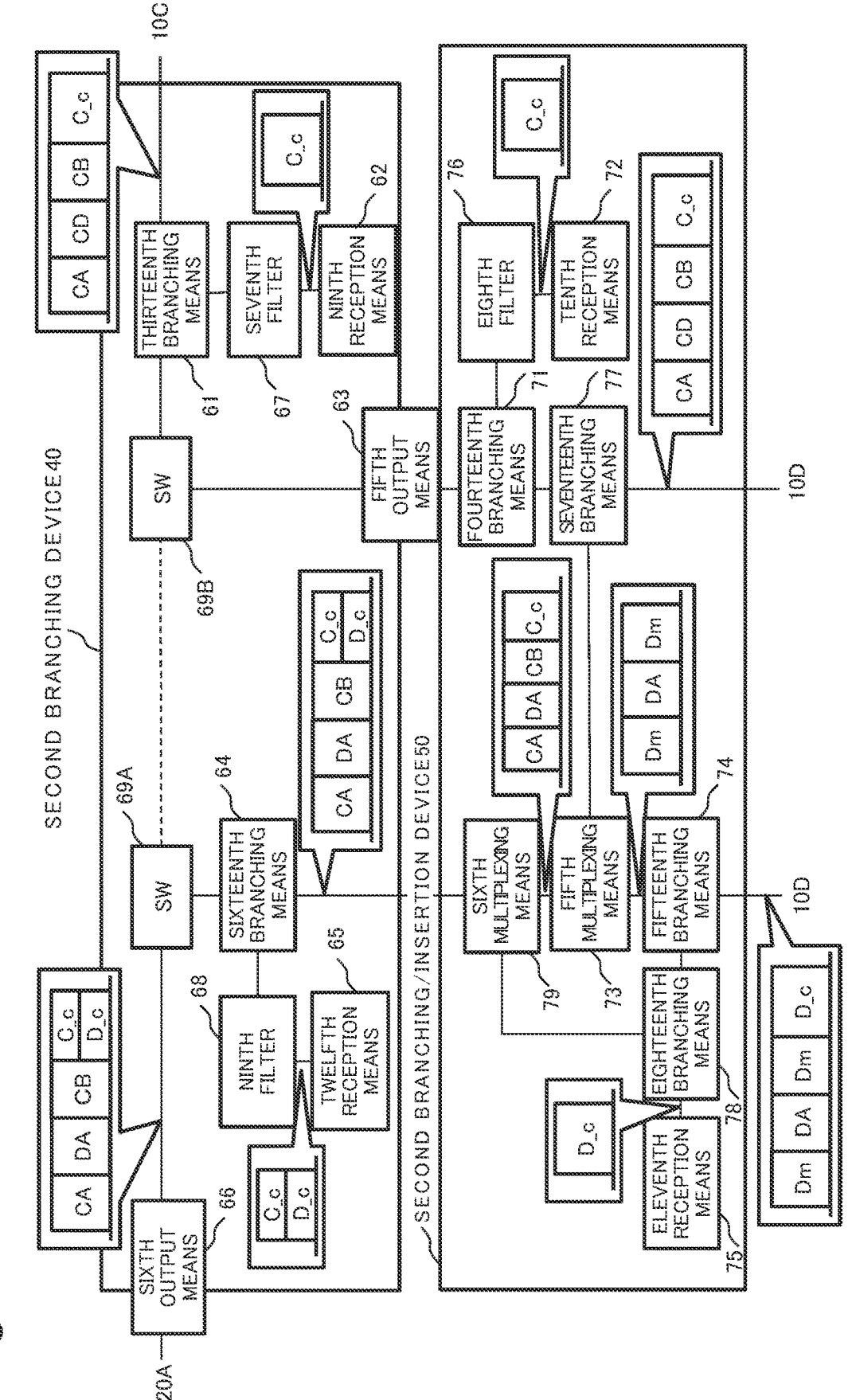
FIG. 8 is a block diagram illustrating details of the submarine optical communication system according to the third example embodiment of the present invention.
Figure 9:
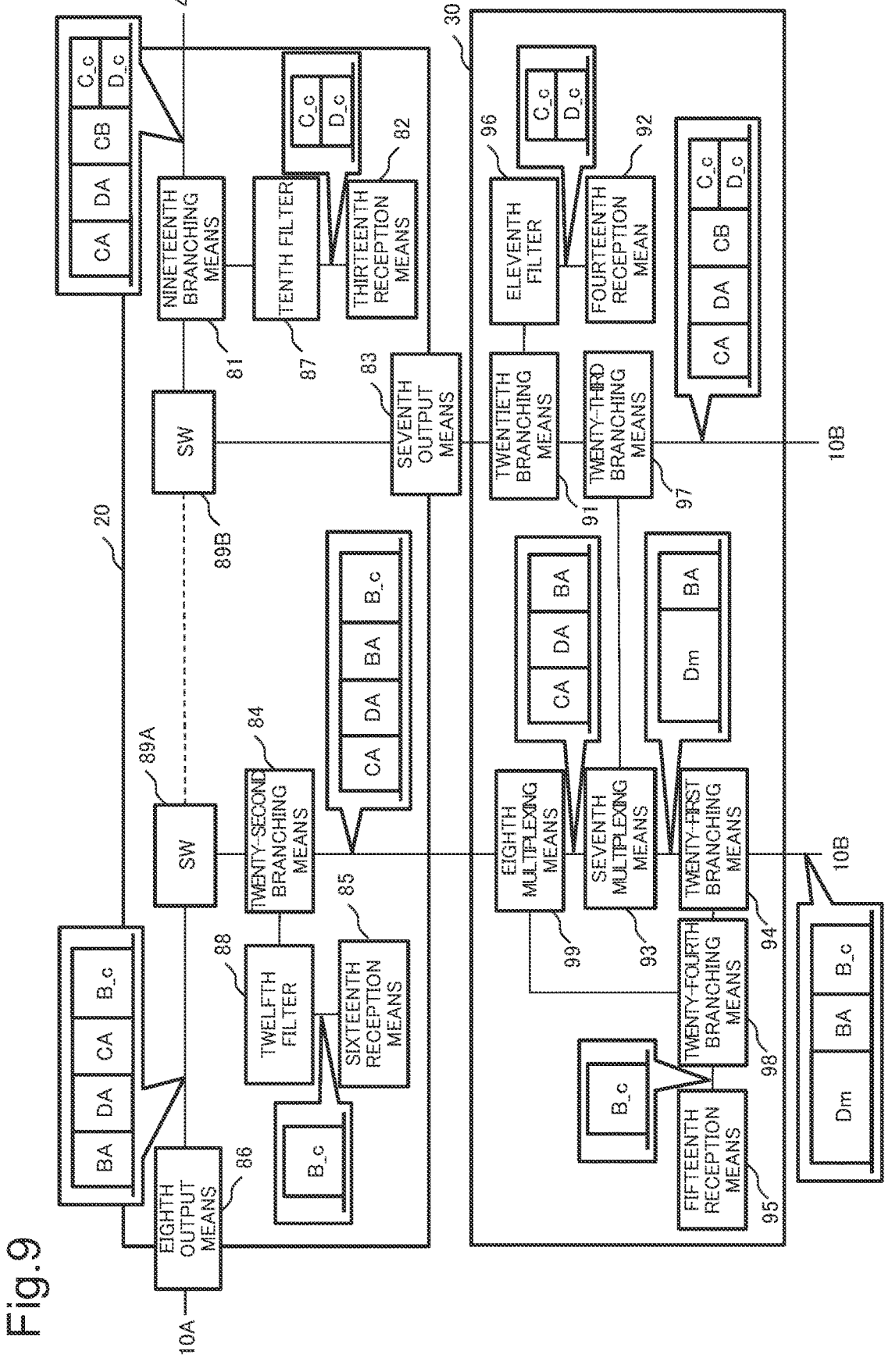
FIG. 9 is a block diagram illustrating details of the submarine optical communication system according to the third example embodiment of the present invention.

A submarine optical communication system 3 according to a third example embodiment is described. FIG. 7 is a block diagram illustrating a configuration example of the submarine optical communication system 3. FIGS. 8 and 9 are block diagrams illustrating details of the submarine optical communication system 3.

As with the submarine optical communication system 2, the submarine optical communication system 3 includes a first terminal station 10A, a second terminal station 10B, a third terminal station 10C, a fourth terminal station 10D, a first branching device 20, a first branching/insertion device 30, a second branching device 40, and a second branching/insertion device 50.

Figure 5:
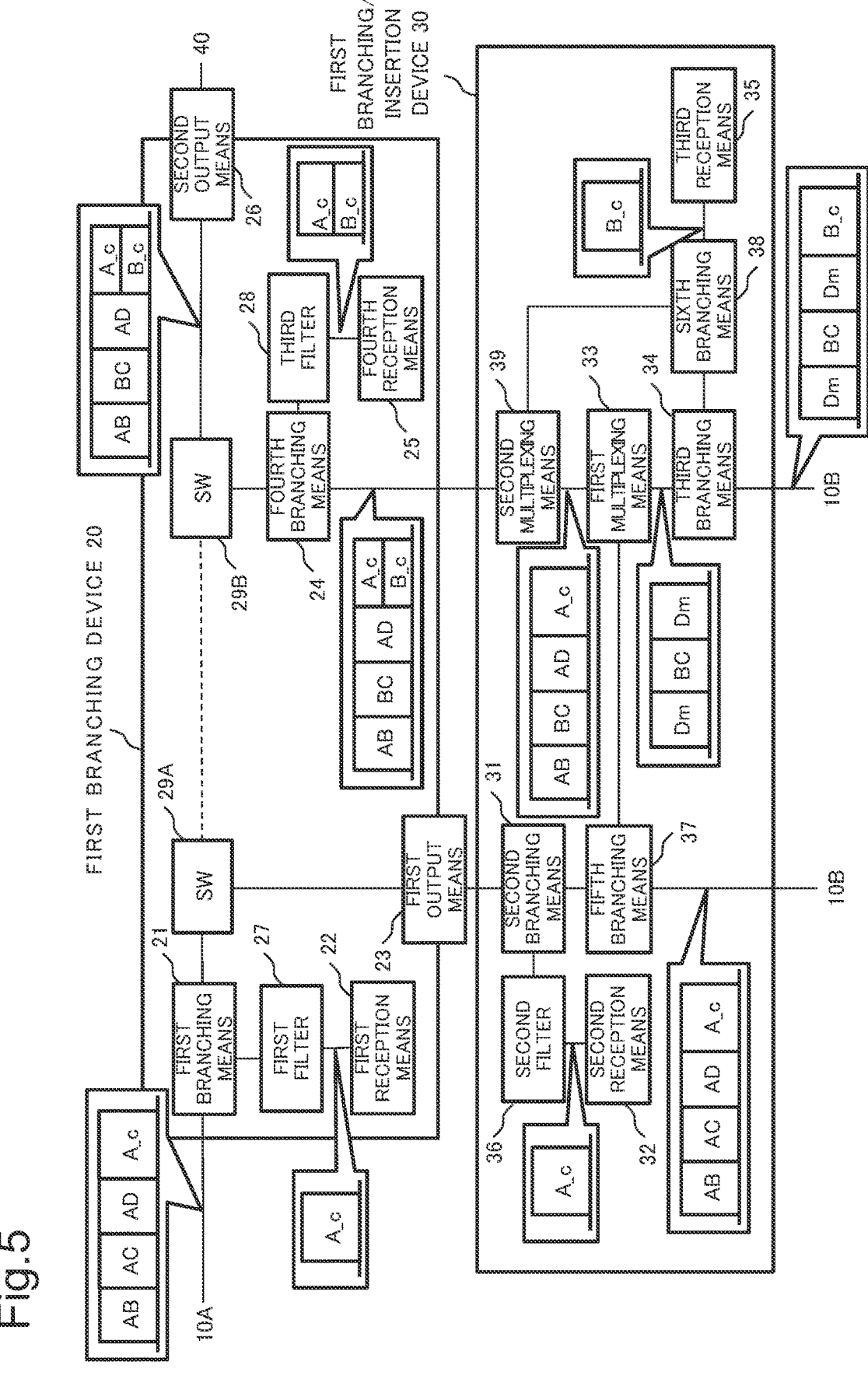
FIG. 5 is a block diagram illustrating details of the submarine optical communication system according to the second example embodiment of the present invention.

As with the first branching device 20 in the submarine optical communication system 2, the first branching device 20 in the submarine optical communication system 3 includes, as illustrated in FIG. 5, a first branching means 21, a first reception means 22, a first output means 23, a fourth branching means 24, a fourth reception means 25, a second output means 26, a first filter 27, a third filter 28, and switches 29A and 29B.

As with the first branching/insertion device 30 in the submarine optical communication system 2, the first branching/insertion device 30 in the submarine optical communication system 3 includes, as illustrated in FIG. 5, a second branching means 31, a second reception means 32, a first multiplexing means 33, a third branching means 34, a third reception means 35, a second filter 36, a fifth branching means 37, a sixth branching means 38, and a second multiplexing means 39.

As with the second branching device 40 in the submarine optical communication system 2, the second branching device 40_in the submarine optical communication system 3 includes, as illustrated in FIG. 6, a seventh branching means 41, a fifth reception means 42, a third output means 43, a tenth branching means 44, an eighth reception means 45, a fourth output means 46, a fourth filter 47, a sixth filter 48, and switches 49A and 49B.

As with the second branching/insertion device 50 in the submarine optical communication system 2, the second branching/insertion device 50 in the submarine optical communication system 3 includes, as illustrated in FIG. 6, an eighth branching means 51, a sixth reception means 52, a third multiplexing means 53, a ninth branching means 54, a seventh reception means 55, a fifth filter 56, an eleventh branching means 57, a twelfth branching means 58, and a fourth multiplexing means 59.

As described above, the submarine optical communication system 3 has a similar configuration to the submarine optical communication system 2. Furthermore, the submarine optical communication system 3 has an additional configuration in comparison with the submarine optical communication system 2.

In the submarine optical communication system 3, the second branching device 40 further includes, as illustrated in FIG. 8, a thirteenth branching means 61, a ninth reception means 62, a fifth output means 63, a sixteenth branching means 64, a twelfth reception means 65, a sixth output means 66, a seventh filter 67, a ninth filter 68, and switches 69A and 69B.

The second branching/insertion device 50 includes, as illustrated in FIG. 8, a fourteenth branching means 71, a tenth reception means 72, a fifth multiplexing means 73, a fifteenth branching means 74, an eleventh reception means 75, an eighth filter 76, a seventeenth branching means 77, an eighteenth branching means 78, and a sixth multiplexing means 79.

The thirteenth branching means 61 can split a fourth optical signal including a fourth main signal (corresponding to, for example, CA, CD, and CB in FIG. 8) and a fourth control signal (corresponding to C_c in FIG. 8) from the third terminal station 10C. The thirteenth branching means 61 is, for example, an optical coupler.

The ninth reception means 62 is capable of receiving the fourth control signal from the fourth optical signal being split by the thirteenth branching means 61. In particular, the ninth reception means 62 receives the fourth control signal, which is in a control wavelength band, via the seventh filter 67. The seventh filter 67 is an optical filter that transmits only a control wavelength band.

The fifth output means 63 is capable of outputting another of the fourth optical signal being split by the thirteenth branching means 61 to the second branching/insertion device 50. In particular, the fifth output means 63 outputs the another of the fourth optical signal to the fourteenth branching means 71 within the second branching/insertion device 50.

In the second branching/insertion device 50, the fourteenth branching means 71 is capable of splitting the fourth optical signal including the fourth main signal and the fourth control signal from the fifth output means 63. The tenth reception means 72 is capable of receiving the fourth control signal from the fourth optical signal being split by the fourteenth branching means 71. In particular, the tenth reception means 72 receives, via the eighth filter 76, the fourth main signal and the fourth control signal that are split by the fourteenth branching means 71. The eighth filter 76 is an optical filter that transmits only the control wavelength band.

The seventeenth branching means 77 further splits the fourth optical signal being split by the fourteenth branching means 71, and outputs the split fourth optical signal to the fourth terminal station 10D and the fifth multiplexing means 73.

The fifteenth branching means 74 is capable of splitting, into each wavelength, a fifth optical signal including a fifth main signal (corresponding to Dm (dummy light) and DA in FIG. 8) and a fifth control signal (corresponding to D_c in FIG. 8) from the fourth terminal station 10D. The fifteenth branching means 74 outputs the fifth main signal to the fifth multiplexing means 73, and outputs the fifth control signal to the eighteenth branching means 78. Note that, the fifth control signal D_c in FIGS. 8 and 9 is the same as a third control signal D_c illustrated in FIG. 6 in that the control signals are transmitted from the fourth terminal station 10D. Meanwhile, the fifth control signal D_c and the third control signal D_c are different signals that propagate through transmission paths different from each other.

The eleventh reception means 75 receives the fifth control signal being split by the fifteenth branching means 74. In particular, the eleventh reception means 75 receives the fifth control signal, which is in the control wavelength band, via the eighteenth branching means 78. The eighteenth branching means splits the fifth control signal, and outputs the split fifth control signal to the sixth multiplexing means 79 as well.

The sixth multiplexing means 79 is capable of multiplexing the fourth optical signal being split by the fourteenth branching means with the fifth optical signal being split by the fifteenth branching means, and outputs third multiplexed light acquired by multiplexing to the second branching device 40.

In particular, the sixth multiplexing means 79 accepts, via the fifth multiplexing means 73 and the seventeenth branching means 77, the fourth optical signal including the fourth main signal and the fourth control signal that are split by the fourteenth branching means 71. Note that, in the example illustrated in FIG. 8, the fifth multiplexing means 73 is an OADM. The fifth multiplexing means 73 extracts main signals CA and CB, from among main signals CA, CD, and CB included in the fourth main signal being split by the fourteenth branching means. The fifth multiplexing means 73 also extracts the main signal DA, from among the dummy light Dm and the main signal DA included in the fifth main signal being split by the fifteenth branching means. The fifth multiplexing means 73 outputs the extracted main signals CA, DA, and CB to the sixth multiplexing means 79.

The fifth multiplexing means 73 is designed to always transmit the control wavelength band. Furthermore, the fourth control signal and the fifth control signal are both optical signals in the control wavelength band. The third terminal station 10C and the fourth terminal station 10D transmit each of the fourth control signal C_c and the fifth control signal D_c at different times from each other.

Accordingly, when the third terminal station 10C has transmitted the fourth control signal C_c in the control wavelength band, the fifth multiplexing means 73 outputs the extracted main signals CA, DA, and CB and the fourth control signal to the sixth multiplexing means 79. In this case, the sixth multiplexing means 79 outputs, as third multiplexed light to the second branching device 40, an optical signal including the extracted main signals CA, DA, and CB and the fourth control signal C_c.

When the fourth terminal station 10D has transmitted the fifth control signal D_c in the control wavelength band, the eighteenth branching means 78 transmits the fifth control signal D_c to the sixth multiplexing means 79. In this situation, since the fourth control signal C_c and the fifth control signal D_c are transmitted at different times from each other, the fourth control signal C_c is not transmitted to the sixth multiplexing means 79. In this case, accordingly, the sixth multiplexing means 79 outputs, as third multiplexed light to the second branching device 40, an optical signal including the extracted main signals CA, DA, and CB and the fifth control signal D_c.

In the second branching device 40, the sixteenth branching means 64 splits the third multiplexed light from the sixth multiplexing means 79. The sixteenth branching means 64 outputs the split third multiplexed light to the ninth filter 68 and the sixth output means 66.

The twelfth reception means 65 receives an optical signal in the control wavelength band from one division of the third multiplexed light being split by the sixteenth branching means 64. In particular, the twelfth reception means 65 receives, via the ninth filter 68, one of the fourth control signal C_c and the fifth control signal D_c included in the third multiplexed light. The ninth filter 68 is an optical filter that transmits only the control wavelength band.

The sixth output means 66 outputs another division of the third multiplexed light being split by the sixteenth branching means 64 to the first branching device 20.

As illustrated in FIG. 9, the first branching device 20 in the submarine optical communication system 3 further includes a nineteenth branching means 81, a thirteenth reception means 82, a seventh output means 83, a twenty-second branching means 84, a sixteenth reception means 85, an eighth output means 86, a tenth filter 87, a twelfth filter 88, and switches 89A and 89B.

The nineteenth branching means 81 further splits the third multiplexed light from the sixth output means 66. The nineteenth branching means 81 outputs the split third multiplexed light to the tenth filter 87 and the seventh output means 83.

The thirteenth reception means 82 receives an optical signal in the control wavelength band from the third multiplexed light being split by the nineteenth branching means 81. In particular, the thirteenth reception means 82 receives an optical signal in the control wavelength band included in the third multiplexed light via the tenth filter 87, which transmits only the control wavelength band. For example, when the third multiplexed light includes the fourth control signal C_c, the thirteenth reception means 82 receives the fourth control signal C_c. When the third multiplexed light includes the fifth control signal D_c, the thirteenth reception means 82 receives the fifth control signal D_c.

The seventh output means 83 outputs another division of the third multiplexed light being split by the nineteenth branching means 81 to the first branching/insertion device 30.

As illustrated in FIG. 9, the first branching/insertion device 30 further includes a twentieth branching means 91, a fourteenth reception means 92, a seventh multiplexing means 93, a twenty-first branching means 94, a fifteenth reception means 95, an eleventh filter 96, a twenty-third branching means 97, a twenty-fourth branching means 98, and an eighth multiplexing means 99.

The twentieth branching means 91 is capable of splitting the third multiplexed light from the seventh output means. The twentieth branching means 91 outputs the split third multiplexed light to the eleventh filter 96 and the twenty-third branching means 97.

The fourteenth reception means 92 is capable of receiving an optical signal in the control wavelength band from the third multiplexed light being split by the twentieth branching means 91. In particular, the fourteenth reception means 92 receives an optical signal in the control wavelength band included in the third multiplexed light via the eleventh filter 96, which transmits only the control wavelength band. For example, when the third multiplexed light includes the fourth control signal C_c, the fourteenth reception means 92 receives the fourth control signal C_c. When the third multiplexed light includes the fifth control signal D_c, the fourteenth reception means 92 receives the fifth control signal D_c.

The twenty-first branching means 94 is capable of splitting a sixth optical signal including a sixth main signal (corresponding to the dummy light Dm and a main signal BA in FIG. 9) and a sixth control signal (corresponding to B_c in FIG. 9) from the second terminal station 10B. The twenty-first branching means 94 splits the sixth optical signal, outputs the sixth control signal to the twenty-fourth branching means 98, and outputs the sixth main signal to the seventh multiplexing means 93. Note that, the sixth control signal B_c in FIGS. 8 and 9 is the same as the second control signal B_c illustrated in FIG. 6 in that the control signals are transmitted from the second terminal station 10B. Meanwhile, the second control signal B_c and the sixth control signal B_c are different signals that propagate through transmission paths different from each other.

The fifteenth reception means 95 is capable of receiving the sixth control signal being split by the twenty-first branching means 94. In particular, the fifteenth reception means 95 receives the sixth control signal via the twenty-fourth branching means 98. The twenty-fourth branching means 98 outputs the split sixth control signal to the eighth multiplexing means 99 as well.

The eighth multiplexing means 99 is capable of multiplexing the sixth main signal and the sixth control signal that are split by the twenty-first branching means 94 with the third multiplexed light being split by the twentieth branching means 91, and outputs fourth multiplexed light acquired by multiplexing to the first branching device 20.

In particular, the eighth multiplexing means 99 accepts, via the seventh multiplexing means 93 and the twenty-fourth branching means 98, the sixth main signal and the sixth control signal that are split by the twenty-first branching means. Note that, in the example illustrated in FIG. 9, the seventh multiplexing means 93 is an OADM. The seventh multiplexing means 93 extracts the main signals CA and DA, from among the main signals CA, DA, and CB included in the third multiplexed light being split by the twentieth branching means 91. The seventh multiplexing means 93 also extracts the main signal BA, from among the dummy light Dm and the main signal BA included in the sixth main signal being split by the twenty-first branching means 94. The seventh multiplexing means 93 outputs the extracted main signals CA, DA, and BA to the eighth multiplexing means 99.

The eighth multiplexing means 99 accepts the sixth control signal from the twenty-fourth branching means 98. The eighth multiplexing means 99 outputs, as fourth multiplexed light to the first branching device 20, an optical signal including the extracted main signals CA, DA, and BA and the sixth control signal B_c.

In the first branching device 20, the twenty-second branching means 84 splits the fourth multiplexed light from the eighth multiplexing means 99. The twenty-second branching means 84 outputs the split fourth multiplexed light to the twelfth filter 88 and the eighth output means 86.

The sixteenth reception means 85 receives the sixth control signal B_c in the control wavelength band from one division of the fourth multiplexed light being split by the twenty-second branching means 84. In particular, the sixteenth reception means 85 receives the sixth control signal B_c from the fourth multiplexed light via the twelfth filter 88, which transmits only the control wavelength band.

The eighth output means 86 outputs another division of the fourth multiplexed light being split by the twenty-second branching means 84 to the first terminal station 10A.

As described above, the submarine optical communication system 3 has a similar configuration to the submarine optical communication system 2, and thus can transmit control signals from a plurality of the terminal stations 10A and 10B to the first branching device 20 and the first branching/insertion device 30. Further, the submarine optical communication system 3 can transmit control signals from a plurality of the terminal stations 10A, 10B, and 10D to the second branching device 40 and the second branching/insertion device 50.

Furthermore, in the submarine optical communication system 3, the first branching device 20 includes the thirteenth reception means 82 that receives the third multiplexed light including at least one of the fourth control signal C_c and the fifth control signal D_c. The first branching/insertion device 30 includes the fourteenth reception means 92 that receives the third multiplexed light including at least one of the fourth control signal C_c and the fifth control signal D_c. The second branching device 40 includes the twelfth reception means 65 that receives the third multiplexed light including at least one of the fourth control signal C_c and the fifth control signal D_c. The second branching/insertion device 50 includes the tenth reception means that receives the fourth control signal C_c, and the eleventh reception means 75 that receives the fifth control signal D_c.

Accordingly, in the submarine optical communication system 3, the first branching device 20, the first branching/insertion device 30, the second branching device 40, and the second branching/insertion device 50 are capable of receiving control signals from all of the first terminal station 10A, the second terminal station 10B, the third terminal station 10C, and the fourth terminal station 10D.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A submarine optical communication system comprising:

a first terminal station; a second terminal station; a third terminal station; a first branching device; and a first branching/insertion device, wherein the first terminal station is capable of transmitting a first optical signal including a first main signal and a first control signal to the first branching device, the second terminal station is capable of transmitting a second optical signal including a second main signal and a second control signal to the first branching/insertion device, the first branching device includes first branching circuit configured to be capable of splitting the first optical signal from the first terminal station, first reception circuit configured to be capable of receiving the first control signal from the first optical signal being split by the first branching circuit, and first output circuit configured to be capable of outputting the first optical signal being split by the first branching circuit to the first branching/insertion device, the first branching/insertion device includes second branching circuit configured to be capable of splitting the first optical signal from the first output circuit, second reception circuit configured to be capable of receiving the first control signal included in the first optical signal being split by the second branching circuit, third branching circuit configured to be capable of splitting the second optical signal from the second terminal station, third reception circuit configured to be capable of receiving the second control signal included in the second optical signal being split by the third branching circuit, and first multiplexing circuit configured to be capable of multiplexing the first optical signal being split by the second branching circuit with the second optical signal being split by the third branching circuit, and outputting first multiplexed light acquired by multiplexing to the first branching device, wavelength bands of the first control signal and the second control signal are an identical control wavelength band, the first terminal station and the second terminal station transmit each of the first control signal and the second control signal at different times from each other, and the first branching device further includes fourth branching circuit configured to split the first multiplexed light from the first multiplexing circuit, fourth reception circuit configured to receive an optical signal in the control wavelength band being included in one piece of the first multiplexed light being split by the fourth branching circuit, and second output circuit configured to output another piece of the first multiplexed light being split by the fourth branching circuit to one of the third terminal station and a second branching device.

2. The submarine optical communication system according to claim 1, further comprising:

a second branching device; a second branching/insertion device; and a fourth terminal station, wherein the second output circuit outputs the first multiplexed light being split by the fourth branching circuit to the second branching device, the second branching device includes fifth branching circuit configured to further split the first multiplexed light from the second output circuit, fifth reception circuit configured to receive an optical signal in the control wavelength band from the first multiplexed light being split by the fifth branching circuit, and third output circuit configured to output another piece of the first multiplexed light being split by the fifth branching circuit to the second branching/insertion device, the second branching/insertion device includes sixth branching circuit configured to be capable of splitting the first multiplexed light from the third output circuit, sixth reception circuit configured to be capable of receiving an optical signal in the control wavelength band from the first multiplexed light being split by the sixth branching-circuit, seventh branching circuit configured to be capable of splitting a third optical signal including a third main signal and a third control signal that are output from the fourth terminal station, seventh reception circuit configured to be capable of receiving the third control signal from the third optical signal being split by the seventh branching circuit, and fourth multiplexing circuit configured to be capable of multiplexing the third optical signal being split by the seventh branching circuit with the first multiplexed light being split by the sixth branching circuit, and outputting second multiplexed light acquired by multiplexing to the second branching device, the third control signal is an optical signal in the control wavelength band, and the second branching device further includes eight branching circuit configured to split the second multiplexed light from the fourth multiplexing circuit, eighth reception circuit configured to receive the third control signal in the control wavelength band from one piece of the second multiplexed light being split by the eighth branching circuit, and fourth output circuit configured to output another piece of the second multiplexed light being split by the eighth branching circuit to the third terminal station.

3. The submarine optical communication system according to claim 2, wherein the second branching device includes ninth branching circuit configured to be capable of splitting a fourth optical signal including a fourth main signal and a fourth control signal from the third terminal station, ninth reception circuit configured to be capable of receiving the fourth control signal from one piece of the fourth optical signal being split by the ninth branching circuit, and fifth output circuit configured to be capable of outputting another piece of the split fourth optical signal to the second branching/insertion device, the second branching/insertion device includes tenth branching circuit configured to be capable of splitting the fourth optical signal from the fifth output circuit, tenth reception circuit configured to be capable of receiving the fourth control signal from the fourth optical signal being split by the tenth branching circuit, eleventh branching circuit configured to be capable of splitting a fifth optical signal including a fifth main signal and a fifth control signal from the fourth terminal station, eleventh reception circuit configured to be capable of receiving the fifth control signal from one piece of the fifth optical signal being split by the eleventh branching circuit, and sixth multiplexing circuit configured to be capable of multiplexing the fourth optical signal being split by the tenth branching circuit with the fifth optical signal being split by the eleventh branching circuit, and outputting third multiplexed light acquired by multiplexing to the second branching device, wavelength bands of the fourth control signal and the fifth control signal are the identical control wavelength band, the third terminal station and the fourth terminal station transmit each of the fourth control signal and the fifth control signal at different times from each other, the second branching device further includes twelfth branching circuit configured to split the third multiplexed light from the sixth multiplexing circuit, twelfth reception circuit configured to receive an optical signal in the control wavelength band from one piece of the third multiplexed light being split by the twelfth branching circuit, and sixth output circuit configured to output another piece of the third multiplexed light being split by the twelfth branching circuit to the first branching device, the first branching device includes nineteenth branching circuit configured to further split the third multiplexed light from the sixth output circuit, thirteenth reception circuit configured to receive an optical signal in the control wavelength band from one piece of the third multiplexed light being split by the thirteenth branching circuit, and seventh output circuit configured to output another piece of the third multiplexed light being split by the thirteenth branching circuit to the first branching/insertion device, the first branching/insertion device includes fourteenth branching circuit configured to be capable of splitting the third multiplexed light from the seventh output circuit, fourteenth reception circuit configured to be capable of receiving an optical signal in the control wavelength band from the third multiplexed light being split by the fourteenth branching circuit, fifteenth branching circuit configured to be capable of splitting a sixth optical signal including a sixth main signal and a sixth control signal from the second terminal station, fifteenth reception circuit configured to be capable of receiving the sixth control signal from the sixth optical signal being split by the fifteenth branching circuit, and eighth multiplexing circuit configured to be capable of multiplexing the sixth optical signal being split by the fifteenth branching circuit with the third multiplexed light being split by the fourteenth branching circuit, and outputting fourth multiplexed light acquired by multiplexing to the first branching device, the first branching device further includes sixteenth branching circuit configured to split the fourth multiplexed light from the eighth multiplexing circuit, sixteenth reception circuit configured to receive the sixth control signal in the control wavelength band from one piece of the fourth multiplexed light being split by the sixteenth branching circuit, and eighth output circuit configured to output another piece of the fourth multiplexed light being split by the sixteenth branching circuit to the first terminal station.

* * * * *